George W. Hildreth's
Imp't. in Gang Plows
4222
REISSUED DEC 27 1870
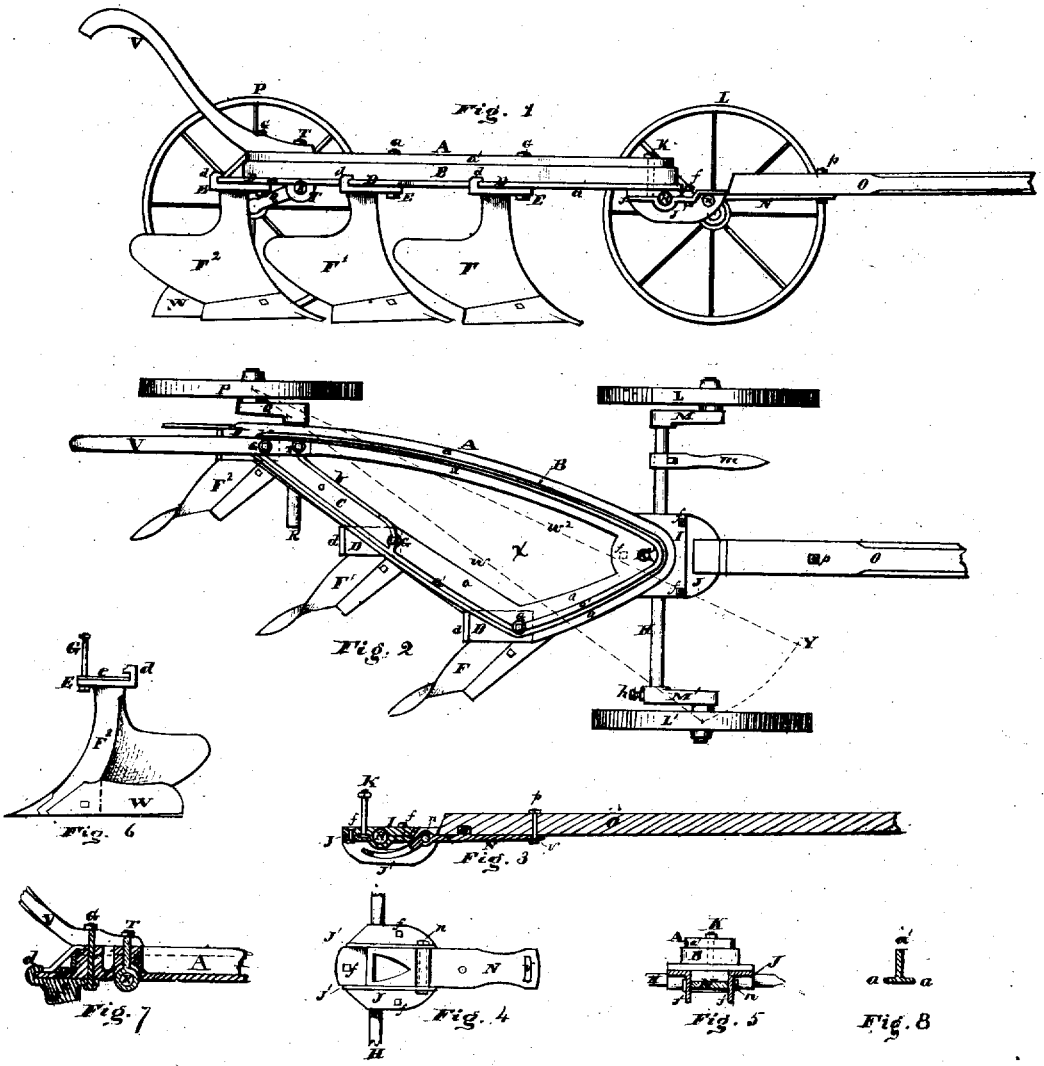
Witnesses
Thos. H. Dodge
Jno. H. Brien
Inventor
George W. Hildreth

United States Patent Office.

GEORGE W. HILDRETH, OF LOCKPORT, NEW YORK.

Letters Patent No. 18,397, dated October 13, 1857; reissue No. 4,222, dated December 27, 1870.

IMPROVEMENT IN GANG-PLOWS.

The Schedule referred to in these Letters Patent and making part of the same.

*To all whom it may concern:*

Be it known that I, GEORGE W. HILDRETH, of Lockport, in the county of Niagara and State of New York, have invented certain new and useful Improvements in Gang-Plows; and I do hereby declare the following to be a full, clear, and exact description of the same, reference being had to the accompanying drawing which forms a part of this specification, in which—

Figure 1 represents a side view of my improved gang-plow.

Figure 2 represents a plan view of the same.

Figure 3 represents a central longitudinal section of the pole, pole-iron, and bolster-plates.

Figure 4 represents a bottom view of the pole-iron and bolster-plate.

Figure 5 represents a transverse vertical section of the pole-iron and bolster-plates.

Figure 6 represents a side view of one of the plows.

Figure 7 represents a longitudinal vertical section through the rear part of the frame and eye-bolt.

Figure 8 represents a cross-section of the cast-iron frame.

To enable those skilled in the art to which my invention belongs to make and use the same, I will proceed to describe it more in detail.

The nature of my invention consists—

First, in the combination, with the frame to which the plows are attached, of crank-supports for adjusting the height of the frame from the ground, for the purposes hereafter stated.

Second, in a crank-axle, for supporting the frame in a gang-plow, provided with one adjustable crank, and so constructed that the supporting-wheels, which turn upon the ends of said crank-axle, can be adjusted in the arcs of circles, so as to run upon the same or upon different horizontal planes, for the purposes hereafter stated.

Third, in the combination, with a supporting-axle in a gang-plow, provided with cranks at its ends, one of which is adjustable independently of the other, of a hand-lever for turning said axle, for the purposes hereinafter stated.

Fourth, in the combination, in a gang-plow, of the following elements, viz.: a supporting-axle, provided with a crank at each end; two supporting-wheels, one on each crank; a hand-lever for turning the axle and cranks; and a holding device for retaining the axle and cranks in position when adjusted.

Fifth, in the combination, with the frame in a gang-plow, of a tongue, which can be moved up or down and to the right and left, for the purposes hereafter stated.

Sixth, in the combination, with the plow-frame, of a laterally-adjustable supporting-axle, for the purposes hereafter stated.

Seventh, in the combination, with a crank-axle in a gang-plow, of an eye-bolt and nut for retaining the crank and its supporting-wheel in any desired adjusted position.

Eighth, in a metallic frame for carrying the plows, as hereafter described.

Ninth, in a combined cast and wrought-iron frame, as shown and described.

Tenth, in the combination, with the main frame, of a tool-box or receptacle cast with the frame, as hereafter described.

Eleventh, in combination, with the frame and axle, of a metallic plate-connection.

Twelfth, in grooved and tongued plow-attaching plates, as hereinafter explained.

Thirteenth, in the combination, in a gang-plow, of short and long land-sides, as and for the purposes hereafter stated.

In the drawing—

The parts marked A represent the main frame of the gang; said frame is constructed of the form shown in figs. 1 and 2, and is made of cast-iron.

Flanges *a a* project each way, at the lower edge of a central rib, *a'*, so that the cross-section of cast metal is of the form shown in fig. 8, thus disposing the parts in such a manner as to obtain the greatest strength with the least weight of metal.

The strength of the frame is further increased by means of a wrought-iron reinforce or band, B, which is heated and shrunk onto the outside of the central rib *a'* of the frame A, in the position indicated in figs. 1 and 2.

An additional vertical flange, *b*, is also cast upon the rear part of the frame, to form an inclosure, C, which serves as a tool-box, in which to carry wrenches, spare bolts, and other articles, when desired.

The frame A is provided, at the positions where the plows are connected thereto, with projections or plates, D, cast with the frame, and having at their under sides longitudinal grooves or channels to receive corresponding tongues, *c*, upon the attaching-plates E, by means of which the plows F $F^1$ $F^2$ are attached to the frame.

The plates E are cast upon the top of the plows F, and they are provided at their rear ends with lips, *d*, which hook over the rear ends of the plates D on the frame, as indicated, while the forward ends of the plates are secured by a single bolt, G, in each. By this means the plows F are attached to the frame in a very convenient and perfect manner; the tongue *c* and groove support the plow against lateral pressure, while all backward strain comes upon the holding-bolts G, which are made sufficiently strong to withstand any ordinary strain; but, in case of any violent strain or pressure upon the plows, the bolts G will either break or their threads be stripped before any other parts of the gang will give way, and, by thus relieving the frame, prevents serious damage to the gang. The plow can afterward be readily re-secured in position by inserting a new bolt, G, a number of which may be kept on hand in the tool-box C. The cost of the bolts G being but a few cents each, and the time required for resetting them being but a few moments, the inconvenience and expense are as nothing compared with the benefit resulting from the relief thus given to the gang-frame and team.

The forward end of the main frame A is carried upon an adjustable crank-axle, H, which is secured between bolster-plates I and J, the frame being pivoted to the upper plate I by means of a king-bolt, K, as fully shown in the drawing. The bolster-plates I and J are provided with corresponding semi-cylindrical lateral grooves, wherein the axle H, which is cylindrical, is fitted.

The axle H can be secured and firmly held between the plates I and J in any adjusted position, by turning down the nuts on the clamp-bolts *f*, which bolts are arranged through the plates I and J in a triangular position, as indicated in figs. 2 and 4.

The carrying-wheels L L′ are arranged at the ends of the axle H, and turn upon cranks M M′, arranged as shown in the drawing, one, M, being rigidly secured in position, and the other, M′, being held in place upon the axle, in this instance, by a set-screw, H, as shown in fig. 2.

By this arrangement of the parts the height of the axle H can be readily adjusted to carry the frame and plows at any desired depth, or to raise the plows clear of the ground, as desired. The axle H can also be adjusted laterally, to enable the wheel L′ to run in the last-made furrow. The wheels L and L′ can also be adjusted independently of each other, in arcs of circles, the centers of which are coincident with the center of the axle, whereby one can be set to run in the furrow and the other upon the unturned sod, or both can be set for the same level when transporting the gang from one field to another.

A hand-lever, M, is attached to the crank-axle H, to facilitate the operation of turning said axle and its cranks, for the purpose of elevating or depressing the frame and plows, or adjusting them to use in different positions.

The lower bolster-plate J is cast with two downward-projecting longitudinal flanges J′, between which the pole-iron N is pivoted by means of a horizontal bolt, *n*, which passes through the parts from side to side, as indicated in figs. 3, 4, and 5, so that the front end of the iron, together with the tongue or draft-pole, can be elevated or depressed at pleasure, while, at the same time, the tongue and pole-iron are sustained against lateral strain by that portion of the pole-iron which projects back of the pivot, and works between the flanges J′

The wood-pole O is attached to the upper side of the pole-iron N by means of a bolt, *p*, at the front end of the pole-iron, and an iron dowel, *s*, which is cast upon the upper side of the pole-iron, and is fitted into a recess formed in the lower side of the pole O, near its rear end, as indicated.

The bolt *p* is arranged in a transverse slot, *v*, formed through the end of the pole-iron, as shown in fig. 4, and the pole O can be adjusted laterally to run the plows more or less to land, by loosening the nut on bolt *p*, and swinging the forward end of the pole to the right or left, as desired.

The dowel *s*, in this case, acts as a fulcrum, and retains the rear end of the pole O in position, while the forward end thereof, is swung around.

A bolt may be arranged through the pole and pole-iron, at the center of the dowel *s*.

The tongue can also be raised and lowered, to suit the height of the team.

The rear wheel P is arranged to turn upon a crank-arm, Q, attached to a short axle, R, upon which the rear part of the frame A is supported.

The axle R is cylindrical in form, and is fitted to a suitable lateral groove formed on the under side of the frame A, where it is retained in position by an eye-bolt, T, which passes up through the frame, A and serves the double purpose of securing the axle R and also the front end of the handle V, the latter being also partially secured by the bolt G, which holds the rear plow $F^2$, all of which is fully indicated in figs. 1, 2, and 7 of the drawing.

A recess is formed in the under side of the frame A, to allow sufficient space for the upper part of the eye-bolt T, so that when it is drawn up by its nut, the crank-shaft R will be securely clamped, so as to hold the crank and its wheel in the desired position.

By the use of an eye-bolt, for holding or retaining a supporting-crank and its wheel, in a gang-plow, the crank can be very readily and conveniently turned, to adjust the position of the wheel, as respects the frame and plows, by simply loosening the nut upon the end of the eye-bolt, and swinging the crank to the desired position, after which the nut is again tightened.

The axle R can be moved laterally, so as to set the wheel P and crank Q nearer to or further from the frame, as desired.

The rear plow $F^2$ is provided with a long land-side, W, as shown in fig. 6, while on the other plows F $F^1$ the land-side is made short, as indicated by the dotted line, as shown on the same figure. This formation allows sufficient space between the plows to turn the sod freely without crowding or clogging, while, at the same time, the long land-side on the rear plow serves to steady and guide the whole gang.

It will be understood, from the foregoing description, that if the right-hand crank is so set that the tread of its wheel L′ will be on a line with the cutting edges of the plow-shares, and the cranks on the opposite side are so set as to run their wheels upon the unturned soil, while the frame A remains in a horizontal position, that the plows will be supported in an even and proper manner for plowing, and that any desired depth of furrow can be turned, by simply raising or lowering the cranks upon which the land-side wheels run.

The devices for adjusting the depth as well as the width of furrow are very simple, and are not liable to become displaced or broken by use.

The three carrying wheels L L′ and P are arranged in such relative positions, as regards each other and the frame A, that when the gang-plow is drawn straight forward with the wheels in the position as shown in fig. 2, the center of gravity, *x*, of the implement is forward of a line, *w*, drawn from the tread or bearing of the right-hand forward wheel L′ to the tread or bearing of the rear wheel P, consequently the frame A is balanced down upon the left-hand forward wheel L, thereby causing the plows to dip forward and run into the ground.

But by swinging the axle H short around to the left in turning, the tread of the wheel L′ is brought to the point marked Y, thereby changing the line of support to the position indicated by line $w^2$, and causing the center of gravity *x* to fall behind said line, when the frame A, balancing down to the rear, throws up the points of the plows, and, by destroying their dip or pitch, causes them to run out of the ground while turning the gang around upon the head-lands.

Upon resuming a straight-forward direction, the center of gravity $x$ is again brought forward of the line of supports $w$, and the pitch or dip of the plows restored, when they immediately enter the ground.

Having described my improvements in gang-plows,

What I claim therein as new, and of my invention, and desire to secure by Letters Patent, is—

1. The combination with the frame A of a gang-plow, of crank-supports M M', for the main carrying and supporting-wheels, whereby the height of the frame from the ground can be adjusted substantially as described.

2. A crank axle-tree, for supporting the frame in a gang-plow, provided with a crank upon each end, one of which is adjustable and so secured to the axle-tree that the supporting wheels, which turn upon the ends of said crank axle-tree, can be adjusted in the arcs of circles, to run upon the same or different horizontal planes, for the purposes above described.

3. The combination with the supporting axle-tree H in a gang-plow, provided with cranks at its ends, one of which is adjustable independently of the other, of a hand-lever, for turning said axle-tree, for the purposes above described.

4. The combination in a gang-plow of the following elements, viz.: A supporting axle-tree, provided with a crank at each end; two supporting wheels, one on each crank; a hand-lever for turning the axle-tree and cranks, and a holding device for retaining the axle-tree and cranks in position when adjusted.

5. The combination, with the frame in a gang-plow, of a tongue or draft-pole, which can be raised and lowered, and also moved to the right and left, for the purposes stated.

6. The combination, with the plow-frame of a laterally adjustable supporting axle-tree H, for the purposes stated.

7. The combination, with a crank axle-tree, Q R, in a gang-plow, of an eye-bolt and nut, for retaining the crank and its supporting wheel in any desired adjusted position.

8. A cast metallic frame, for carrying the gang of plows, constructed substantially as above described.

9. A combined cast and wrought-iron frame for gang-plows, constructed substantially as shown and described.

10. The combination, with the cast-iron main frame, of a tool-box cast with said frame, substantially as shown and described.

11. The combination, with the frame and axle-tree in a gang-plow, of a metallic plate connection J J'.

12. The grooved and tongued plow-attaching plates D E, substantially as and for the purposes set forth.

13. The combination in a gang-plow of a series of plows, having long and short land-sides, substantially as and for the purposes set forth.

GEORGE W. HILDRETH.

Witnesses:
THOS. H. DODGE,
JNO. H. BUCK.